United States Patent
Kobayashi

(10) Patent No.: US 9,774,251 B2
(45) Date of Patent: Sep. 26, 2017

(54) BOOST CONVERTER WITH IMPROVED STABILITY

(75) Inventor: Hidenori Kobayashi, Kawasaki (JP)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 305 days.

(21) Appl. No.: 12/930,178

(22) Filed: Dec. 30, 2010

(65) Prior Publication Data

US 2012/0146611 A1    Jun. 14, 2012

(30) Foreign Application Priority Data

Dec. 14, 2010 (EP) .................................... 10368046

(51) Int. Cl.
*H02M 3/156* (2006.01)
*G05F 1/10* (2006.01)

(52) U.S. Cl.
CPC .............. *H02M 3/156* (2013.01); *G05F 1/10* (2013.01)

(58) Field of Classification Search
CPC ... H02M 3/156; H02M 3/1588; Y02B 70/126; G05F 1/613; G05F 1/10; G05F 1/56; G05F 1/44
USPC ................................ 323/222, 223, 282, 284
See application file for complete search history.

(56) References Cited

U.S. PATENT DOCUMENTS

| | | | |
|---|---|---|---|
| 6,225,795 B1 * | 5/2001 | Stratakos et al. .............. 323/283 |
| 6,343,026 B1 * | 1/2002 | Perry .................... H02M 3/285 323/272 |
| 7,202,694 B2 | 4/2007 | Eberlein |
| 7,372,238 B1 * | 5/2008 | Tomiyoshi .................... 323/224 |
| 7,372,241 B1 * | 5/2008 | Tomiyoshi .................... 323/288 |
| 7,528,590 B2 | 5/2009 | Wei |
| 7,671,574 B1 | 3/2010 | Burinskiy et al. |
| 2004/0000897 A1 * | 1/2004 | Asayama .......... H02M 3/33515 323/283 |
| 2004/0212420 A1 | 10/2004 | Otake |
| 2005/0237042 A1 * | 10/2005 | Yoshida et al. ............... 323/282 |
| 2009/0001943 A1 | 1/2009 | Slezak et al. |
| 2009/0284178 A1 * | 11/2009 | Jessenig ................ H02M 3/156 315/297 |
| 2010/0033146 A1 * | 2/2010 | Irissou et al. .................. 323/282 |
| 2010/0079181 A1 | 4/2010 | Barrenscheen et al. |
| 2010/0231184 A1 * | 9/2010 | Wei ........................ H02M 3/156 323/282 |
| 2011/0260703 A1 * | 10/2011 | Laur et al. ..................... 323/271 |

OTHER PUBLICATIONS

European Search Report—App. No. 10368046.8-2207 dated—Jul. 29, 2011.

* cited by examiner

*Primary Examiner* — Gustavo Rosario Benitez
(74) *Attorney, Agent, or Firm* — Saile Ackerman LLC; Stephen B. Ackerman

(57) ABSTRACT

Systems and methods for providing a boost converter with an improved stability are disclosed. A sample and hold circuit is connected to the output of the boost converter. That sample and hold circuit holds the output voltage before the main switch of the boost converter turns ON and holds the voltage while the main switch is ON. Thus a high frequency oscillation can be eliminated, an increased control bandwidth without stability problems can be achieved, and no complicated additional circuit is required.

10 Claims, 3 Drawing Sheets

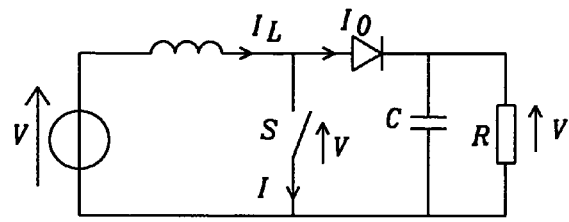
FIG. 1 - Prior Art
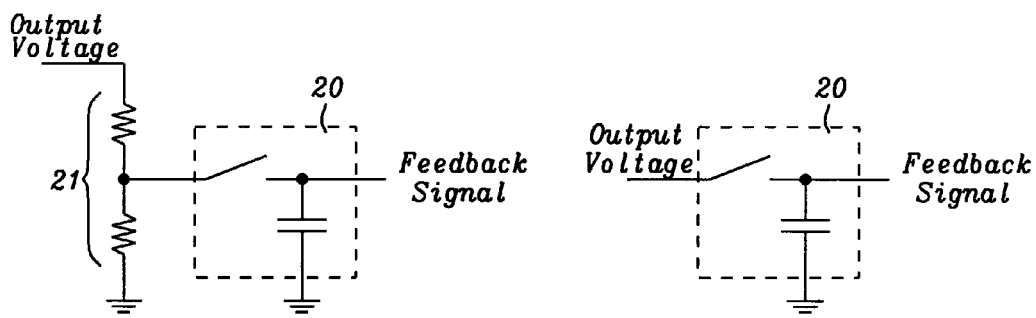
FIG. 2     FIG. 3
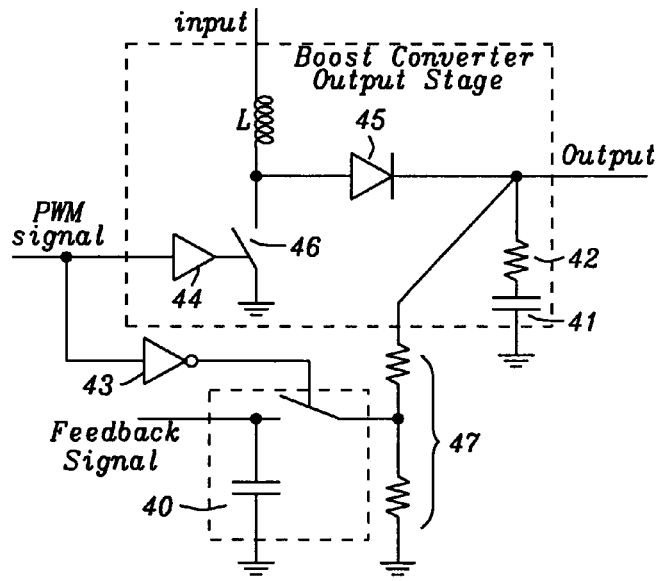
FIG. 4

BOOST CONVERTER WITH IMPROVED STABILITY

BACKGROUND (1) Field of the Invention

This invention relates generally to DC-to-DC converters and relates more specifically to boost switching regulators having a highly stabilized output.

(2) Description of the Prior Art

A boost converter (step-up converter) is a power converter with an output DC voltage greater than its input DC voltage. It is a class of switching-mode power supply (SMPS) containing and at least one energy storage element. Filters made of capacitors (sometimes in combination with inductors) are normally added to the output of the converter to reduce output voltage ripple.

The key principle that drives the boost converter is the tendency of an inductor to resist changes in current. When being charged it acts as a load and absorbs energy (somewhat like a resistor), when being discharged, it acts as an energy source (somewhat like a battery). The voltage it produces during the discharge phase is related to the rate of change of current, and not to the original charging voltage, thus allowing different input and output voltages.

FIG. 1 prior art shows the basic principle of a Boost converter consisting of two distinct states depending of the state of main switch S:

In the On-state, the main switch S is closed, resulting in an increase in the inductor current;

In the Off-state, the main switch S is open and the only path offered to inductor current is through the fly back diode D, the capacitor C and the load R. This results in transferring the energy accumulated during the On-state into the capacitor.

Feedback and control circuitry can be deployed with the circuit to regulate the energy transfer and maintain a constant output within normal operating conditions.

From a power management standpoint, one of the critical blocks that hinder the complete integration of switching DC-DC converters is the frequency compensation circuit, whose design is based on the values of off-chip LC filter components. Since these LC filter values vary, because of various design requirements, manufacturer tolerances, and/or parameter drifts, integration of a compensation circuit implies a non-optimal control design and a lower bandwidth solution.

The direct impact of a non-optimal compensation circuit is reflected in the transient response performance of the regulator, which is critical for voltage accuracy and stability in portable applications when driving switching loads. The poor transient response can be offset by increasing the size of the output capacitor, requiring more PCB real estate and cost.

It is a challenge for engineers to design the higher bandwidth control loop without causing instability program.

There are known patents or patent publications dealing boost converters:

U.S. Patent Publication (US 2009/0001943 to Szlezak et al.) discloses a boost converter circuit that includes a power supply, an inductor coupled to the power supply to receive current from the power supply, a diode coupled to receive current from the inductor and coupled to provide current to a load as an output, an inductor switch coupled to a node between the inductor and the diode for selectively switching current from the inductor anyway from the diode, and a ramp circuit. The ramp circuit is coupled to the node between the inductor and the diode, and is configured to selectively sample a voltage at the node between the inductor and the diode via a sampling switch and use the sampled signal to produce a stabilization ramp to stabilize the output.

U.S. patent (U.S. Pat. No. 7,528,590 to Wei) proposes a DC-to-DC boost converter circuit receiving a DC input voltage and converting it to a DC output voltage at a different voltage level than the DC input voltage. The DC-to-DC boost converter includes a switching power converter for receiving the input voltage on an input and converting the input voltage to an output as the DC output voltage in response to pulse control signals. A switching controller generates the pulse control signals during a switching cycle. The switching controller further includes pulse-skipping circuitry for generating a pulse width modulated signal to the switching power converter. A pulse width of the pulse width modulated signal is decreased responsive to a voltage level of an output voltage of the DC to DC boost converter being less than a control saw tooth waveform and the pulses width of the pulse width modulated signal is increased responsive to the voltage level of the output voltage of the DC to DC boost converter being greater than the control saw tooth waveform.

U.S. patent application (U.S. Pat. No. 7,202,694 to Eberlein) proposes circuits and methods to sense the current through a coil of an integrated switching converter, applicable to boost and to buck converters. The present invention uses a "replica biasing" technique to avoid a resistor for current measurement. The current through a pass device is mirrored into a replica, having a scale of n and being much smaller in size, of said pass device. The current through the replica is mirrored to another branch of the circuit and back again to achieve a fast stabilization of the current. The current through the replica is mirrored again to an output branch of the circuit, which conducts exactly a fraction 1/n of the current flowing through the pass device. The self-biasing current loop of the invention adapts quickly to the actual current level through the pass device of the switching converter. Accuracies better than 5% are achieved over a wide range of dynamic range.

SUMMARY

A principal object of the present invention is to eliminate high frequency (sub-harmonic) oscillations of the output of boost converters.

A further object of the invention is to increase a high control bandwidth without compromising stability A further object of the present invention is to keep the circuit design simple and at low cost.

Moreover an object of the present invention is to achieve the required voltage regulation with a smaller output capacitor.

In accordance with the objects of this invention, a method to achieve a boost converter having an improved stability has been disclosed. The method invented, comprises the steps of: (1) providing a boost converter, (2) deploying a sample and hold circuit connected to an output voltage of the boost converter, (3) using the sample and hold circuit output as feedback voltage, and (4) using a main switch drive signal to control the sample and hold circuit.

In accordance with the objects of this invention a boost converter having an improved stability has been achieved. The boost converter invented comprises: an output capacitor, and a sample and hold circuit, controlled by a control signal, providing a feedback signal, wherein the sample and hold circuit is connected to an output of the boost converter, and wherein the circuit is enabled to hold an output voltage while a main switch of the boost converter is ON, wherein the feedback voltage is increased immediately after a duty cycle is changed.

BRIEF DESCRIPTION OF THE DRAWINGS

In the accompanying drawings forming a material part of this description, there is shown:

FIG. 1 prior art shows the basic principle of a Boost converter consisting of two distinct states FIG. 2 shows output voltage and feedback voltages of a boost converter with a Sample & Hold circuit with a resistive divider.

FIG. 3 shows output voltage and feedback voltages of a boost converter with a Sample & Hold circuit without a resistive divider FIG. 4 shows a boost output stage and a feedback network with a Sample & Hold circuit

DESCRIPTION OF THE PREFERRED EMBODIMENTS

Figure 5:
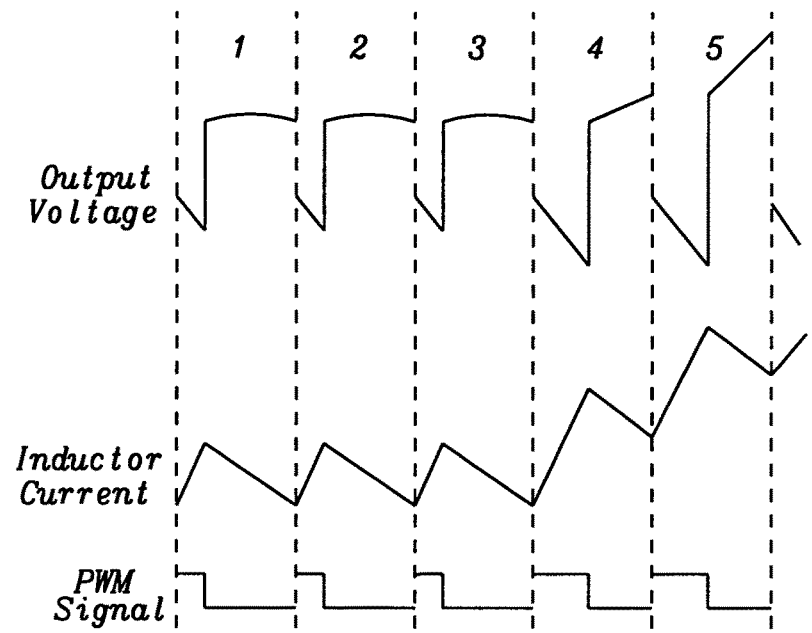
FIG. 5 illustrates the output and current waveform of a boost converter without a sample & hold circuit with a duty cycle change event at four cycles.

Methods and circuits to alleviate/remove the high frequency oscillation of pulse width modulation (PWM) controlled boost converters capable of a high frequency control loop are disclosed. In the preferred embodiments of the invention described sample & hold circuits between the output and pulse-width modulated (PWM) control circuit of a boost converter solve the problem of high frequency oscillations. The most common control method for boost converters is pulse-width modulation (PWM).

The output of the boost converter is sampled before a main switch of the boost converter is on, and holds its voltage during the time the boost main switch is on.

Any analog sample & hold circuit could be used with the present invention, but most simple and practical way to implement this is one switch (transistor) and one capacitor circuit. Two examples of a simple implementation of the present invention are shown in FIG. 2 and FIG. 3.

FIG. 2 shows output voltage and feedback voltages of a boost converter with a Sample & Hold circuit with a resistive divider. In FIG. 2, the sample & hold circuit 20 is inserted between after an output voltage resistive divider 21 and the output is used as a feedback signal for an internal control circuit (compensation circuit). If there is no resistive divider, the sample and hold circuit 20 is placed at the converter output shown in FIG. 3. If the internal control circuit input impedance is not high, a high speed and high input impedance analog buffer is needed between sample & hold circuit and internal control circuit.

The drive signal of the boost main switch can be utilized by changing its polarity as a control (timing) signal of this sample & hold circuit. However, as long as we can achieve the above sample & hold behavior, any timing signal can be used.

In the PWM control loop of a boost converter, the converter tends to be unstable/causes oscillation when the control feedback loop has high bandwidth and has a certain open loop gain around the switching frequency. This makes a high-speed control loop design difficult, and sometimes a larger output capacitor has to be used to satisfy the required line & load transient response.

FIG. 4 shows a boost output stage and a feedback network with a sample & hold network. Furthermore FIG. 4 depicts an inductor L of the boost converter, an output capacitor 41 having an ESR 42, an inverter 43, a buffer 44, an output diode 45, a voltage divider 47, and a switch 46. In this preferred embodiment of the invention, the drive PWM signal for the boost converter is used after changing its polarity, to control the sample and hold circuit 40.

FIG. 5 shows a typical output voltage waveform of a boost converter without a sample & hold circuit having a duty cycle change at the fourth cycle. First three cycles, the converter is in steady state. When the boost main switch is on, i.e. when the PWM signal shown in FIG. 5 is high, inductor current is increased, and output voltage is decreased due to the nature of boost converter. Because of the equivalent series resistance (ESR) of the output capacitor, there is voltage jump when the main switch is on and off. This voltage gap is depends on the product of ESR and inductor current.

At the fourth cycle, the duty cycle is changed from ~25% to ~50% in FIG. 5. As a result, the inductor current increases immediately after a change of duty ratio, however, the output voltage does not increase immediately. The average voltage is even decreased at the fourth cycle. This is so-called 'right half plane zero' effect, and causes instability. This instability can be explained as follows:

a) The control circuit tries to increase the output voltage by some reason.
b) It generates wider duty ratio PWM signal than in previous cycle.
c) The output voltage is not increased for a few cycles
d) The control circuit tries to further increase the duty ratio (wider PWM signal) in order to increase the output voltage.
e) The output voltage is not increased again due to the duty cycle change
f) d)~e) can be repeated (positive feedback) and cause large overshoot/instability Even to make matters worse, ordinary PWM control circuits control on time (high pulse) according to the output voltage. If the control circuit has high bandwidth, this on-time control is mainly dependent on the output voltage when the main switch is on. Therefore, the 'right half plane zero' effect is reinforced by the ESR of the output capacitor.

Figure 6:
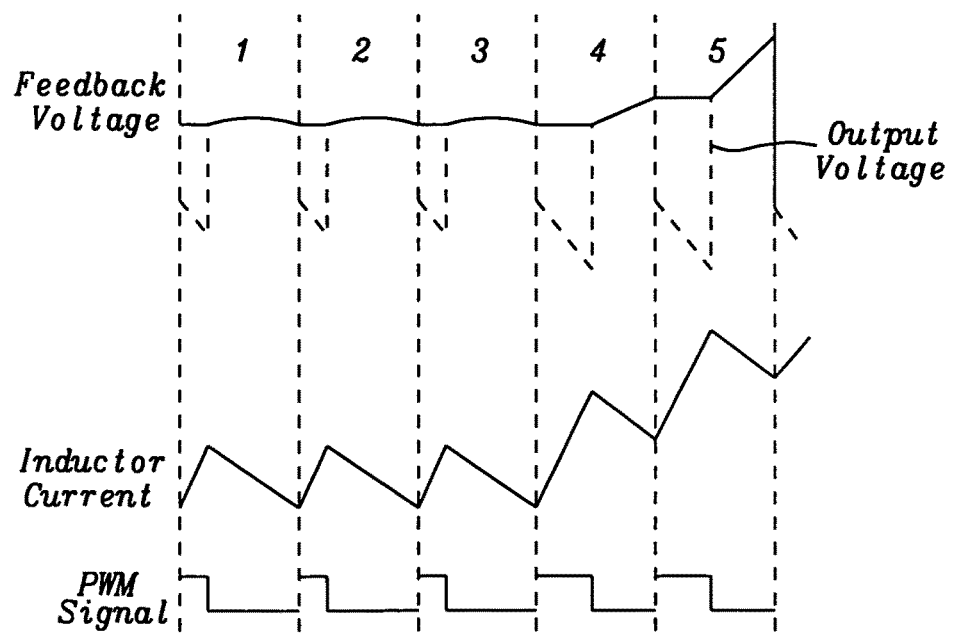
FIG. 6 shows the output and current waveform of the boost converter with sample & hold circuit.

FIG. 6 shows the waveform of the internal feedback voltage of a boost converter with a sample & hold circuit 40 of the present invention. The dotted line shows the output voltage. The conditions are exactly same as in FIG. 5. The sample & hold circuit 40 holds the voltage at the end of main switch off period and holds it when the main switch turns ON (PWM signal becomes high) and holds the voltage during the main switch is ON (PWM signal is high), so the feedback signal does not have a voltage jump due to the ESR 42 of the output capacitor 41. Also, at cycle 4, the feedback voltage is increased immediately after duty cycle change. Even the control circuit has high bandwidth, the positive feedback does not occur, and instability problem is solved. The objective of this sampling & hold circuit 40, shown in FIG. 4, is to remove the voltage jump from the feedback signal. In FIG. 5, there is no sampling & hold circuit, so the output voltage becomes a feedback signal, and feeds into the control circuit. Therefore, the control circuit can see the voltage jump. However, in FIG. 6 the sampling and hold circuit 40 holds the higher voltage when the main switch is on, and removes the voltage gap. This way, no gap signal becomes a feedback signal and feeds into the control circuit.

Figure 7:
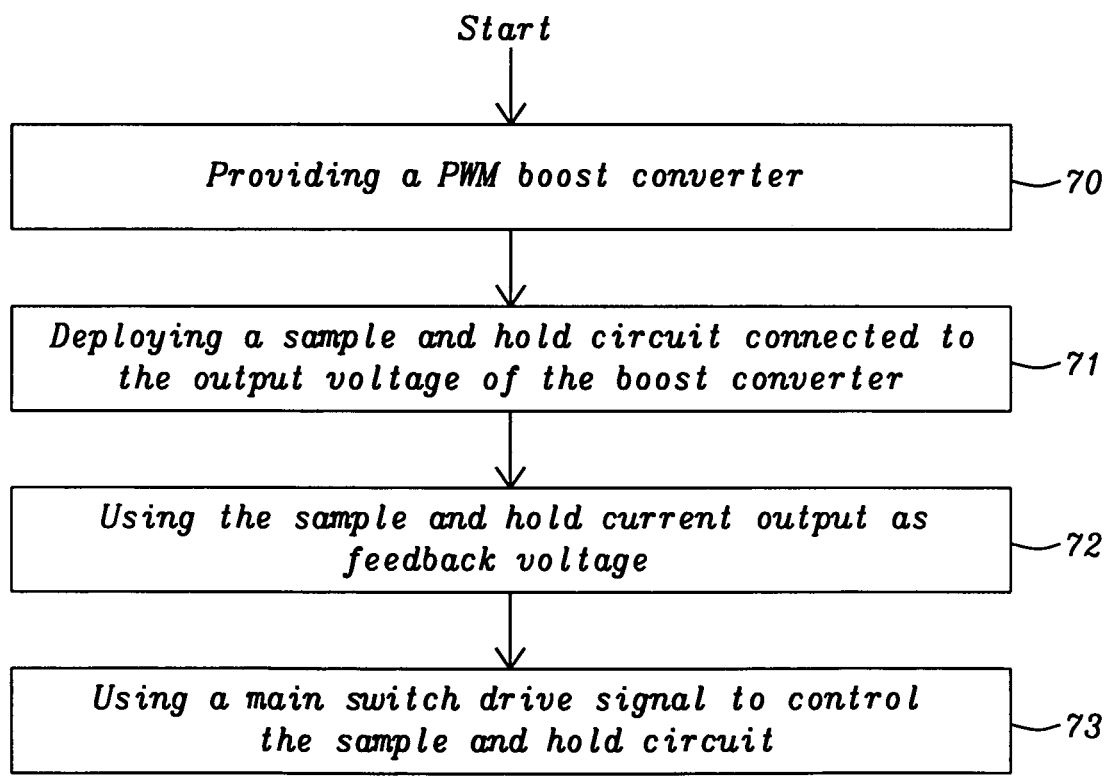
FIG. 7 illustrates a flowchart of a method invented to provide a boost converter with improved stability.

FIG. 7 illustrates a flowchart of a method to provide a boost converter with an improved stability implemented utilizing a simple circuitry.

Step 70 of the method of FIG. 7 illustrates the provision of a PWM boost converter. Step 71 depicts deploying a sample and hold circuit connected to an output voltage of the boost converter. In a preferred embodiment of the invention the sample and hold circuit is optionally connected to the output of the boost converter via a resistive divider. Step 72 describes using the sample and hold circuit output as feedback voltage; and step 73 describes using a main switch drive signal to control the sample and hold circuit.

While the invention has been particularly shown and described with reference to the preferred embodiments thereof, it will be understood by those skilled in the art that various changes in form and details may be made without departing from the spirit and scope of the invention.

What is claimed is:

1. A method to achieve a boost converter having an improved stability, comprising the following steps:
   (1) providing the boost converter comprising a main switch, a control circuit, an inverting means, and an output voltage port;
   (2) deploying a sample and hold circuit connected between the output voltage port and an input of the control circuit of the boost converter, wherein the sample and hold circuit is connected to the output voltage port of the boost converter via a resistive voltage divider;
   (3) using a sample and hold circuit output as a sole feedback voltage to the control circuit; and
   (4) using an inverted main switch PWM drive signal to control the sample and hold circuit, wherein the sample and hold circuit is configured to sample an output voltage of the boost converter at an end of main switch OFF period and to hold the output voltage during the main switch ON period and wherein the main switch PWM drive signal for the boost converter is configured to control the sample and hold circuit after changing its polarity by said inverting means.

2. The method of claim 1 wherein the sample and hold circuit comprises a switch and a capacitor.

3. The method of claim 1 wherein said sample and hold circuit comprises
   a switch, which is set by a control signal, wherein a first terminal of the switch is connected to the output voltage port of the boost converter; and
   a capacitor that is deployed between ground and a second terminal of said switch.

4. A boost converter having an improved stability comprises:
   a main switch;
   an inverting means configured to invert a PWM driver signal;
   an output stage comprising a main switch and an output voltage port;
   a pulse width modulated (PWM) control circuit configured to control the main switch by the PWM driver signal and to receive a feedback signal from an output of a sample and hold circuit;
   an output capacitor; and
   said sample and hold circuit, configured to receive a voltage feedback from the output port of the output stage and to be controlled by the inverted main switch PWM driver signal, providing a feedback signal to the PWM control circuit, wherein the sample and hold circuit is connected between the output voltage port and the input of the PWM control circuit of the boost converter, and wherein the sample and hold circuit is enabled to sample an output voltage of the boost converter at the end of the main switch OFF period and to hold the output voltage during the main switch ON period, wherein a feedback voltage is increased immediately after a duty cycle is changed and wherein the PWM drive signal for the boost converter is configured to control the sample and hold circuit after changing its polarity by said inverting means, wherein the sample and hold circuit is connected to the output voltage port of the boost converter via a resistive voltage divider.

5. The boost converter of claim 4 wherein the sample and hold circuit comprises a switch and a capacitor.

6. The boost converter of claim 4 wherein any timing signal can be used for said control signal as long a desired sample & hold behavior is maintained.

7. The boost converter of claim 4 wherein said sample and hold circuit comprises
   a switch, which is set by said control signal, wherein a first terminal of the switch is connected to the output voltage port of the boost converter; and
   a capacitor that is deployed between ground and a second terminal of said switch.

8. The boost converter of claim 4 wherein said boost converter is a PWM boost converter.

9. The method of claim 1 wherein the inverting means is an inverting diode.

10. The boost converter of claim 4 wherein the inverting means is an inverting diode.

* * * * *